US008354076B2

(12) United States Patent
Daniel et al.

(10) Patent No.: US 8,354,076 B2
(45) Date of Patent: Jan. 15, 2013

(54) FLUID STIRRING MECHANISM

(75) Inventors: Jürgen H. Daniel, San Francisco, CA (US); Meng H. Lean, Santa Clara, CA (US); Armin R. Völkel, Mountain View, CA (US)

(73) Assignee: Palo Alto Research Center Incorporated

( * ) Notice: Subject to any disclaimer, the term of this patent is extended or adjusted under 35 U.S.C. 154(b) by 1509 days.

(21) Appl. No.: 11/537,679

(22) Filed: Oct. 2, 2006

(65) Prior Publication Data

US 2008/0081004 A1 Apr. 3, 2008

(51) Int. Cl.
*B01L 3/00* (2006.01)
*B01J 19/00* (2006.01)
*B01F 11/00* (2006.01)
*B01F 7/00* (2006.01)

(52) U.S. Cl. ........ 422/503; 422/502; 422/224; 366/243; 366/244; 366/245; 366/248; 366/249; 366/279; 366/308

(58) Field of Classification Search .................... 422/50, 422/99–104; 366/102, 103, 279, 308, 144–149, 366/241, 243–245, 248, 249
See application file for complete search history.

(56) References Cited

U.S. PATENT DOCUMENTS

| | | | | |
|---|---|---|---|---|
| 6,234,666 | B1 * | 5/2001 | Kolb | 366/279 |
| 6,494,613 | B2 * | 12/2002 | Terentiev | 366/279 |
| 6,568,052 | B1 * | 5/2003 | Rife et al. | 29/25.35 |
| 2004/0251135 | A1 | 12/2004 | Lean et al. | |
| 2004/0251136 | A1 | 12/2004 | Lean et al. | |
| 2004/0251139 | A1 | 12/2004 | Lean et al. | |
| 2005/0123930 | A1 | 6/2005 | Lean et al. | |
| 2005/0123992 | A1 | 6/2005 | Volkel et al. | |
| 2005/0247564 | A1 | 11/2005 | Volkel et al. | |
| 2005/0247565 | A1 | 11/2005 | Hsieh et al. | |
| 2006/0038120 | A1 | 2/2006 | Lean et al. | |

* cited by examiner

*Primary Examiner* — Dean Kwak

(74) *Attorney, Agent, or Firm* — Fay Sharpe LLP

(57) ABSTRACT

A fluidic system and method includes a channel reservoir which holds 1.5 milliliters or less of fluid. The agitation mechanism, which is partially integrated with the channel or reservoir, includes a fiber or rod at least partially situated within the channel or reservoir, and which acts to move or vibrate to stir and/or agitate fluid within the channel or reservoir. The fluid is then extracted from an extraction area following the agitation or stirring operation.

14 Claims, 13 Drawing Sheets

FLUID STIRRING MECHANISM

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Contract No. W911NF-05-C-0075 awarded by the U.S. Army.

BACKGROUND

The present application relates to the field of fluidic systems, and more particularly, to stirring/agitation of fluid within micro-fluidic systems.

Micro-fluidics is directed to the behavior, control and manipulation of microliter and smaller volumes of fluids. It is a multidisciplinary field bringing together physics, chemistry, engineering and biotechnology, with practical applications to the design of systems in which such small volumes of fluids will be used. Micro-fluidics has applications in the development of DNA chips, micro-propulsion, micro-thermal technologies, and lab-on-a-chip technology, among others.

The behavior of fluids at the microscale can differ from 'macrofluidic' behavior in that factors such as surface tension, energy dissipation, and fluid resistance start become main factors in such system. Micro-fluidics studies how these behaviors change, and how they can be worked around, or exploited for new uses. At these scales, some interesting and non-intuitive properties appear. For example, the Reynolds number, which characterizes the presence of fluid flow turbulence, is extremely low, resulting in a laminar fluid flow.

Extracting a sample fluid from a collection chamber of a fluidic system can be challenging, particularly when the collection chamber contains small amounts of fluid, such as in the range of approximately 1.5 milliliters down to 10 microliters. One type of fluidic system which holds such small amounts of fluids is a particle concentrator to which the present concepts are applicable.

Particle concentrators operate on a sample fluid containing particles of organic, inorganic, as well as other biomaterials to capture a concentrated sample, usually within a fluid channel or collection chamber. Thereafter, the concentrate sample is commonly extracted from the particle concentrator using a pipette, a syringe needle, pressure driven extraction, such as jetting, or by other appropriate mechanisms. An issue in such systems is that the particles may adhere to surfaces of the particle concentrator due to adhesive forces such as electrostatic or Van der Waals attractive forces. When this occurs, the particles which have adhered to the surfaces of the particle concentrator will not be extracted, resulting in a lower amount of the particles being obtained for investigation.

Another use of fluidic systems is for mixing together two distinct fluids, for example, to obtain a chemical reaction, heat transfer, etc. Often the two fluids do not mix rapidly enough by diffusion simply by bringing them together, resulting in an incomplete mixing of the fluids even after an extended period of time. This result may affect the outcome of the process which may have been undertaken for commercial and/or experimental reasons. In each of the above situations and others, an active rapid mixing of fluids may be desirable.

One proposal for the agitation or stirring of fluids is by the use of a bead stirrer or external ultrasonic agitation. An alternative form of agitation is by fluid-flow induced agitation accomplished by pumping a fluid in the extraction chamber back and forth by the application of an external pressure source. Examples of such ultrasonic and fluid-flow agitation are set forth in patents and applications cited within the Incorporation by Reference section of this document.

INCORPORATION BY REFERENCE

U.S. Patent Application Publication No. US2004/0251135A1 (U.S. Ser. No. 10/459,799, Filed Jun. 12, 2003), published on Dec. 16, 2004, by Meng H. Lean et al., and entitled, "Distributed Multi-Segmented Reconfigurable Traveling Wave Grids for Separation of Proteins in Gel Electrophoresis"; U.S. Patent Application Publication No. US2005/0247564A1 (U.S. Ser. No. 10/838,570, Filed May 4, 2004), published on Nov. 10, 2005, by Armin R. Volkel et al., and entitled, "Continuous Flow Particle Concentrator"; U.S. Patent Publication No. US2005/0247565A1 (U.S. Ser. No. 10/838,937; Filed May 4, 2004), published on Nov. 10, 2005, by Hsieh et al., and entitled, "Portable Bioagent Concentrator"; U.S. Patent Application Publication No. US2004/0251139A1 (U.S. Ser. No. 10/460,137, Filed Jun. 12, 2003), published on Dec. 16, 2004, by Meng H. Lean et al., and entitled, "Traveling Wave Algorithms to Focus and Concentrate Proteins in Gel Electrophoresis"; U.S. Patent Application Publication No. US2005/0123930A1 (U.S. Ser. No. 10/727,301, Filed Dec. 3, 2003), published on Jun. 9, 2005, by Meng H. Lean et al., and entitled, "Traveling Wave Grids and Algorithms for Biomolecule Separation, Transport and Focusing"; U.S. Patent Application Publication No. US2005/0123992A1 (U.S. Ser. No. 10/727,289, Filed Dec. 3, 2003), published on Jun. 9, 2005, by Volkel et al., and entitled, "Concentration and Focusing of Bio-Agents and Micron-Sized Particles Using Traveling Wave Grids"; U.S. Patent Application Publication No. US2004/0251136A1 (U.S. Ser. No. 10/460,724, Filed Jun. 12, 2003), published on Dec. 16, 2004, by Meng H. Lean et al., and entitled, "Isoelectric Focusing (IEF) of Proteins With Sequential and Oppositely Directed Traveling Waves in Gel Electrophoresis"; and U.S. Patent Application Publication No. US2006/0038120A1 (U.S. Ser. No. 10/921,556, Filed Aug. 19, 2004), published Feb. 23, 2006, by Meng H. Lean et al., entitled "Sample Manipulator", U.S. patent application Ser. No. 11/468,523, filed Aug. 30, 2006, entitled, "Particle Extraction Methods And Systems For A Particle Concentrator", by Meng H. Lean et al.; and U.S. patent application Ser. No. 11/537,700, filed Oct. 2, 2006, entitled, "Improved Pipette With Agitation Feature", by Jürgen H. Daniel et al., each hereby incorporated herein by reference in their entireties.

BRIEF DESCRIPTION

A fluidic system and method includes a channel reservoir which holds 1.5 milliliters or less of fluid. The agitation mechanism, which is partially integrated with the channel or reservoir, includes a fiber or rod at least partially situated within the channel or reservoir, and which acts to move or vibrate to stir and/or agitate fluid within the channel or reservoir. The fluid is then extracted from an extraction area following the agitation or stirring operation.

BRIEF DESCRIPTION OF THE DRAWINGS

The present subject matter may take form in various components and arrangements of components, and in various steps and arrangements of steps. The drawings are only for purposes of illustrating preferred embodiments and are not to be construed as limiting the subject matter.

DETAILED DESCRIPTION

Figure 1:
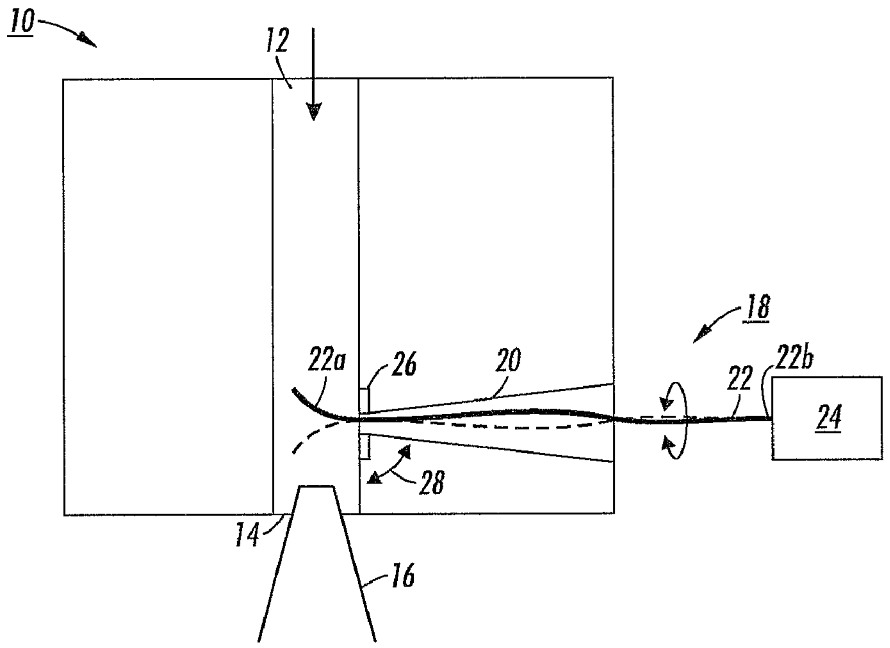
FIG. 1 is a schematic drawing of a stirring/agitation mechanism used with a fluid system.

FIG. 1 depicts a fluidic system, such as a micro-fluidic system, 10 incorporating the concepts of the present application. It is understood that as used herein fluid may be any liquid or gas (including air) and in some instances the fluid may be considered inhomogeneous. Fluidic system 10 includes a fluidic channel (also recited herein as a collection chamber or concentrate reservoir or reservoir) 12 and an extraction area 14. It is to be appreciated that FIG. 1 depicts what is commonly only a portion of a larger fluidic system. For example, fluidic system 10 may be a particle concentrator which includes a fluid flow chamber having a traveling wave grid. Examples of such devices have been described in the Incorporation by Reference section of this document. In such concentrators, fluidic channel 12 holds a concentrated sample of particles (such as bioagents) to be extracted at extraction area 14 into a sample capture reservoir 16. Following extraction, sample capture reservoir 16 is removed from its association with fluidic system 10, and the captured concentrated sample is transferred to other analytical devices for investigation and experimentation.

It is common that some percentage of the particles will undesirably adhere or settle to or on the sidewalls or bottom/top surface of the fluidic system. One idea to address this issue is the application of coatings to the surfaces of the fluidic system. The coatings are comprised of materials which make such adhesion less likely, thereby increasing the number of particles extracted. However, while positive results have been achieved using appropriate surface coatings, it is considered that a further benefit may be obtained by the use of mechanical stirring or agitation of the fluid prior to extraction. While useful in any fluidic system, such active stirring is particularly useful in small sized fluidic systems. For example, the amount of fluid in the fluidic channel of some fluidic systems may be as little as 1.5 milliliters down to 10 microliters or less, and in some particular embodiments, 300 microliters. Operating at these volume levels even a small number of particles lost to adhesion or settling is of concern. Moreover, a high detection sensitivity is desired for typical tests and the amount of particles can be low.

Thus fluidic system 10 of FIG. 1 has been designed with a stirring/agitation mechanism 18, which includes a tube or access channel 20 integrated in the fluidic system, a stirring element 22 at least partially located within the interior of tube 20, and an external actuator 24 which controls movement of stirring element 22. The interconnection point between the fluidic channel 12 and tube 20 creates a passageway between these two elements. A seal 26 is provided at the entry point of tube 20 to fluidic channel 12 to ensure fluid from the channel does not leak. Stirring element 22 may in one design be a fiber (embedded) extending into the fluidic channel, having a first stirring end 22$a$ and a second stirring end 22$b$, where first stirring end 22$a$ extends into fluidic channel 12, and second stirring end 22$b$ is in operative potentially removable connection with external actuator 24. By the above configuration, actuator 24 is separable from the rest of the stirring/agitation mechanism. Therefore, if the fluidic system is disposable, the external actuator 24 may be disconnected from the stirring element 22 and reused. Tube or access channel 20 may in the embodiment shown in FIG. 1 be a cone-shaped tube such as a pipette tip, where the opening or aperture associated with the collection chamber or concentrate reservoir 12 is a narrowed opening compared to the distant opening of the tube. However, it is to be understood other configurations may be employed, such as a tube having the same sized openings or apertures at both ends. Moreover, the access channel 20 may be an etched, molded or otherwise machined 'V-shaped' cut-out in the material the fluidic channel is made of.

Operation of actuator 24, causes stirring element 22 to move (e.g., vibrate), resulting in actuation of first stirring end 22$a$, which in turn disturbs the fluid within fluidic channel 12. Actuator 24 may be a mechanical actuator such as an electric motor, a piezo actuator, an electrostrictive or magnetostrictive actuator. It may be a thermal actuator which causes a mechanical force by, e.g, heating a bimetallic element. It may also be an actuator based on electroactive polymers (artificial muscle materials) such as the ones described in 'Electroactive Polymer Actuators as Artificial Muscles', by Yoseph Bar-Cohen, SPIE Press, 2001. The actuator 24 may also generate an alternating magnetic field which in turn interacts with a magnetic element at the end of fiber 22, thus causing movement of fiber 22. The actuator 24 may also consist of an 'air' pressure system that periodically blows a stream of air (or other fluid) at the end of fiber 22 in order to cause a deflection. These are examples of actuation mechanisms and other mechanisms may be applied that directly or indirectly transfer a force onto the fiber/rod 22. More particularly, fluid is sufficiently agitated to cause particles which have adhered to either the sides or bottom/top of the fluidic channel 12 to break the adhesion bonds, permitting the particles to go into suspension within the fluid. Following operation of this stirring/agitation procedure, fluid is then removed from the fluidic channel 12 into the sample capture reservoir 16. Alternatively, the fluid may continue to flow within a micro-fluidic channel to be further processed or analyzed. In a further alternative scenario, a reaction is detected at or near the location of the stirring actuator, e.g., by optical means such as fluorescence detection or detection of a change of color. Other sensing methods such as thermal sensing or electrochemical sensing of changes in the fluid may also be applied.

In this design, the main orientation of the stirring/agitation mechanism 18 is substantially perpendicular to the orientation of fluidic channel 12 (i.e., the flow direction of the fluid), with first stirring end 22*a* vibrating in a back and forth manner. Of course, actuator 24 can be operated to move the stirring element 22 in other motions where actuator 24 motivates stirring element 22 by piezo force, magnetic actuation electrostatic actuation or other mechanical forces. Alternatively to its shown perpendicular position to fluidic channel 12, tube 20 may be oriented at an oblique angle as represented by arrow 28, thereby altering interaction of the first stirring end 22*a* with fluid of fluidic channel 12. Tube/channel 20 may be made with a hydrophobic coating (more generally: low surface-energy coating, such as Cytop from Asahi Glass Ltd.) to prevent liquid from entering the tube/channel.

It is possible to design stirring element 22 in a number of different configurations. For example, it may be a flexible fiber consisting of a single or multiple materials, with the first stirring end 22*a* made of a material having a greater degree of flexibility than portions within tube 20. As shown more particularly in FIGS. 14A-14F and FIGS. 15A-15D, the fiber may have a diameter that changes along its axis; still further, it may branch out into multiple ends or fibers at first stirring end 22*a*; the cross section of the stirring element 22 may have various shapes such as a round, rectangular, polygon, etc. (shape). Although not shown, it may have small weights attached to the first stirring end 22*a* to cause greater deflection of the stirring element inside fluidic channel 12; it may be coated with material which renders it biocompatible or which prevents adhesion of particles to the stirring element. Further, the stirring element may have any combination of the above features.

In the embodiment shown in FIG. 1, stirring element 22 is a 100 micron diameter fiber located within a 3 millimeter wide and 1.5 millimeter high fluidic channel. Additionally, seal 26 may be a known self-sealing seal, or a piece of tape such as polyimide (e.g., Kapton™) with a hole located therethrough and through which the stirring element enters the channel area, or any other sealing element which maintains the integrity of the fluidic system 10. The seal 26 has to maintain the flexibility of the fiber/stirring element 22 and therefore it must not be too rigid. Seal 26 may be also a thin polymer (e.g., epoxy, polycarbonate, silicone, etc.) wall with a vertical slit, fabricated, e.g., by photolithography, molding or other fabrication methods. It also may be a polymer wall into which a hole was drilled laterally, e.g., by laser machining. Although polymer walls would result in the greatest flexibility, the wall also could be made of a different material such as thin metal or glass. The seal 26 could also be a drop of elastomeric polymer (such as a silicone gel) which may be applied, e.g., after the fiber 22 has been inserted. A narrow through-hole as in the embodiment in FIG. 1 acts as a fulcrum. In order to achieve good sealing, the fiber may be locally surrounded at the through-hole by an elastomer such as a silicone gel. In further embodiments, the channels or reservoirs may have an associated heater element located, for example, on a bottom side of the channels or reservoirs to heat fluid, such as in PCR or other systems. Since the heater is on the bottom surface, it is not shown in the figures, but it is understood such is, in certain embodiments, part of systems as depicted in this and other figures.

Figure 2:
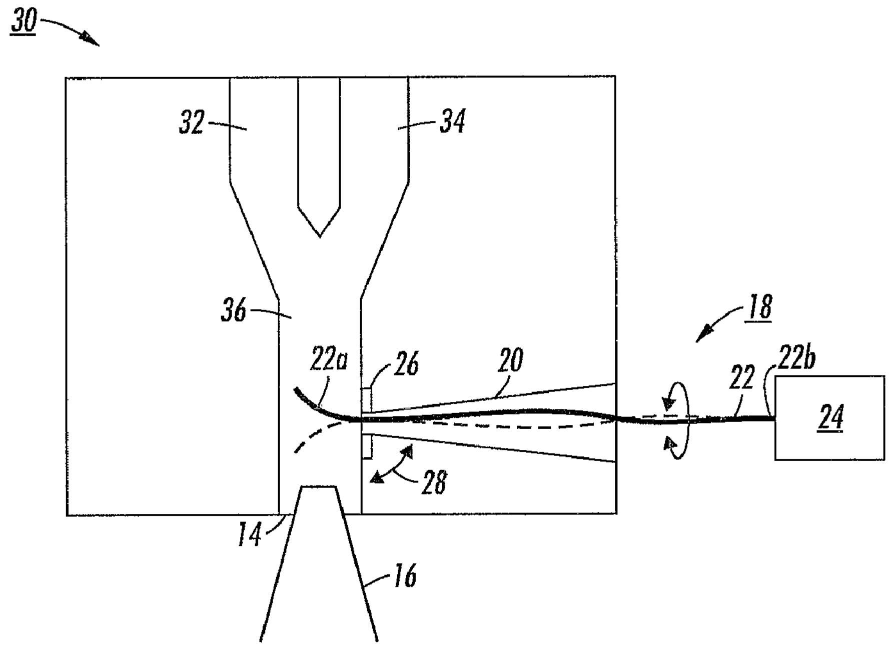
FIG. 2 is a schematic of a stirring/agitation mechanism used with a fluid system which mixes distinct fluids merged within a merge channel.

Turning to FIG. 2, set forth is an alternative fluidic system 30 substantially similar to the fluidic system of FIG. 1, but used for mixing of two fluids. Fluidic system 30 includes first fluidic channel 32, second fluidic channel 34, and merge fluidic channel 36. In this design, a first fluid is provided to first fluidic channel 32 and a second fluid to second fluidic channel 34. The intent of such a system is to have the first fluid and second fluid combined in merge fluidic channel 36 where the two fluids mix resulting in a chemical reaction, thermal transfer, among other results. Here, the amount of fluid in the channel may not be well defined, particularly if it is a continuous-flow system in which two fluid streams are being mixed continuously. Over time the amount of fluid flowing though the channel can well exceed 1.5 milliliters. While not intended as limiting to the present disclosure, channels or chambers of devices such as shown in FIGS. 1 and 2, including those which operate on fluids in the micro-fluidic range or smaller, may commonly be on the order of several hundred microns up to ~2-3 mm in height and up to several millimeters in width.

With continuing attention to FIG. 2, and similar to FIG. 1, stirring/agitation mechanism 18 is provided in operative connection to merge fluidic channel 36. Similar elements of stirring/agitation mechanism 18 of FIG. 1 are similarly numbered in FIG. 2. A distinction between FIG. 1 and FIG. 2, is that stirring/agitation mechanism 18 is used to intermix the first fluid and second fluid to speed up the chemical reaction, improve the thermal transfer, etc. Thus, since the first use of the stirring/agitation mechanism is to agitate the fluid in order to break adhesions, and the second use is to intermix two fluids, the stirring element, and in particular first stirring end 22*a*, may be designed differently for each implementation. The fluid/fluids which may be stirred using the concepts of the present application may be any of a number of different types of liquid, including but not limited to aqueous solutions, particularly aqueous solutions containing biological substances, or in micro-chemical fluidic systems the fluids may include organic solvents, acids and bases or other types of chemical fluids. The fluids may also contain staining compounds such as fluorescent dyes or quantum dot markers or pH-value indicating dyes in order to visualize the success of a chemical reaction or a biological binding process. Still further, the fluid/fluids could be gas/gases, including gas/gases containing particles.

Stirring with the described mechanisms becomes more difficult when the viscosity of the fluids increases, and if the particle loading becomes very high, the force of the stirring mechanism may not be not high enough due to flexibility of the fiber/rod, For example in some embodiments, depending on the stirring elements used, a viscosity of ~100 centipoises and a maximum particle loading of 30% by volume may be considered an upper limit of fluid which may be mixed.

Figure 3:
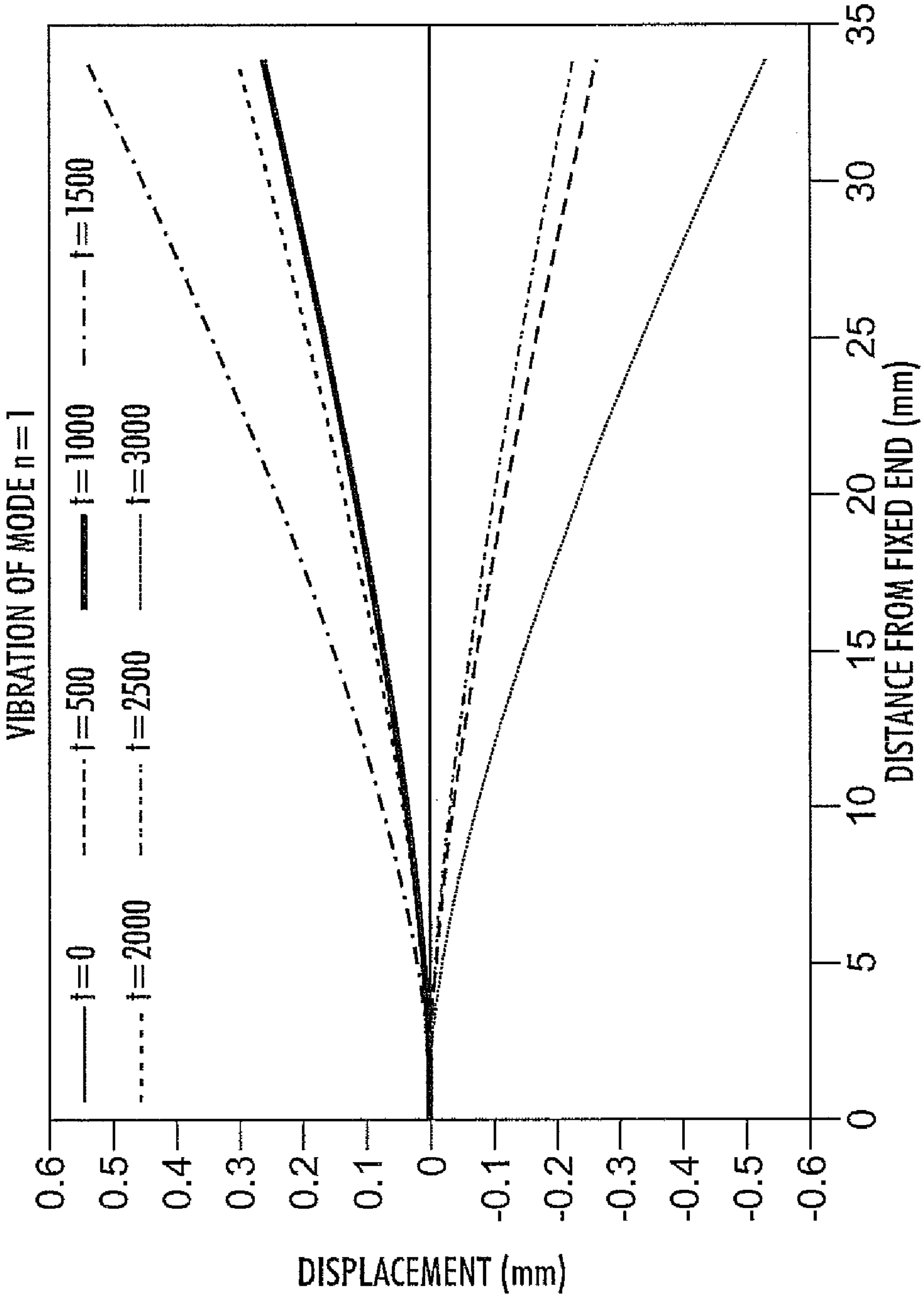
FIG. 3 is an illustration for a first vibration mode of a stirring/agitation mechanism.
Figure 4:
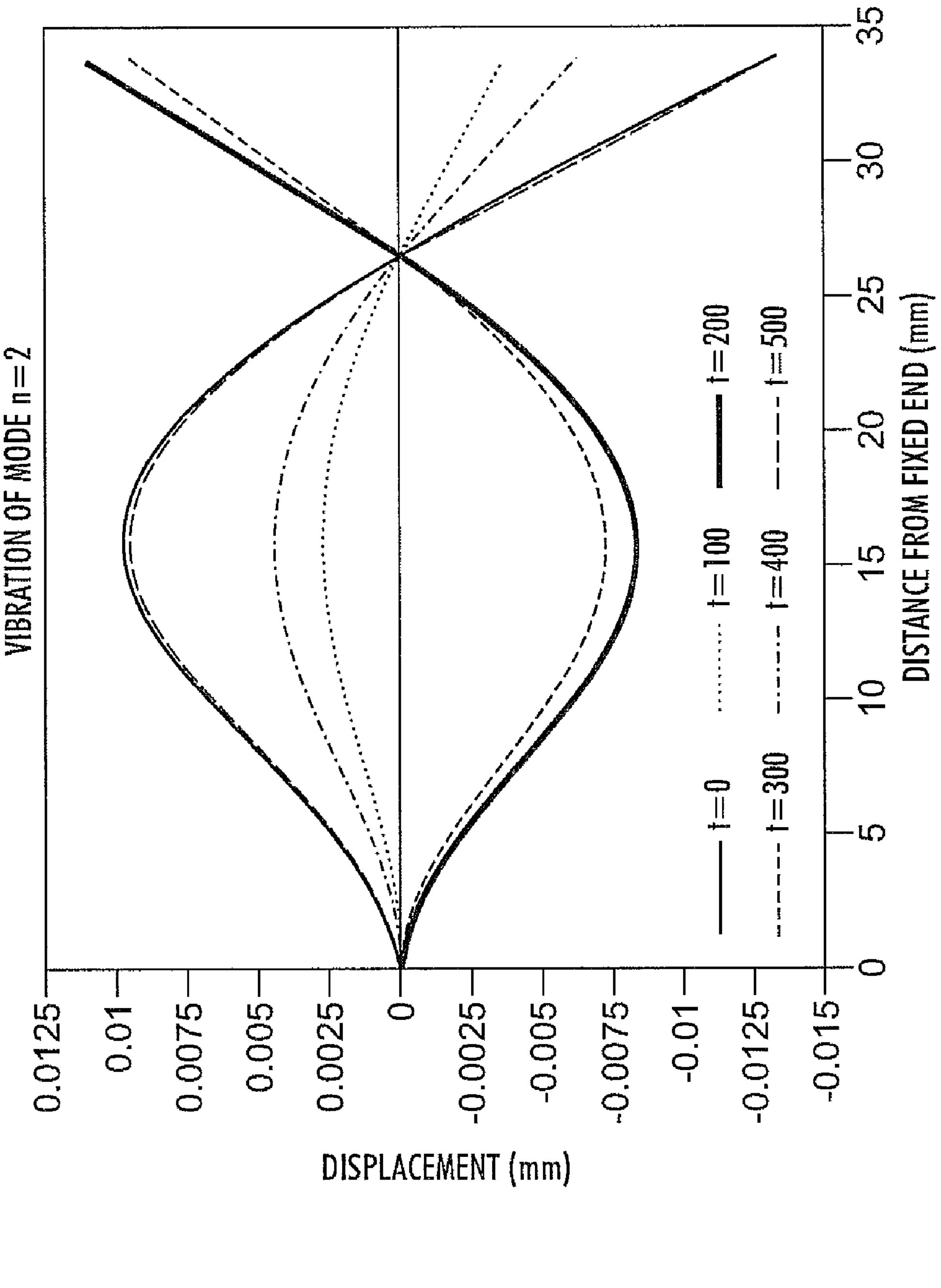
FIG. 4 illustrates a second vibration mode.

As illustrated in FIGS. 3 and 4, the actuation mechanism may be operated in distinct modes. For example, FIG. 3 shows the deflection of a cantilever beam at various points of time for the first vibration mode. In FIG. 4, a second vibration mode for a cantilever is illustrated and it shows a nodal point (point of no displacement). Higher vibration modes have several nodal points. These vibration modes are representative of the motion for a suspended cantilever, such as the design for stirring/agitation mechanism 18 of FIGS. 1 and 2. Typical calculations for vibrating beams or cantilevers, including damping effects can be found, e.g., in 'A. Dimiarogonas: Vibration for Engineers', $2^{nd}$ edition, Prentice Hall, 1996

The highest deflection of first stirring end 22*a* is observed at or near resonant frequency of a vibration mode with node at the location of seal 26 for the stirring element 22, and this frequency may therefore be chosen as an operational frequency. The stirring element should be mounted so that it is not too rigidly constrained. However, fluid from the fluid chamber must not be able to leak through openings near the stirring element. In order to provide sufficient flexibility and fluidic sealing the stirring element may be attached in one location with an elastic silicone gel or it is attached to a thin membrane.

Attachment of the stirring element may coincide with a vibration node such as in FIG. 4. The excitation frequency may be scanned periodically through a frequency range in order to meet the resonance condition at least part of the time. This is of significance since the stirring element will be damped by the liquid in the channel and various effects such as pressure changes due to the fluid flow, temperature changes or dimensional variations will result in changes of the resonance frequencies.

Figure 5:
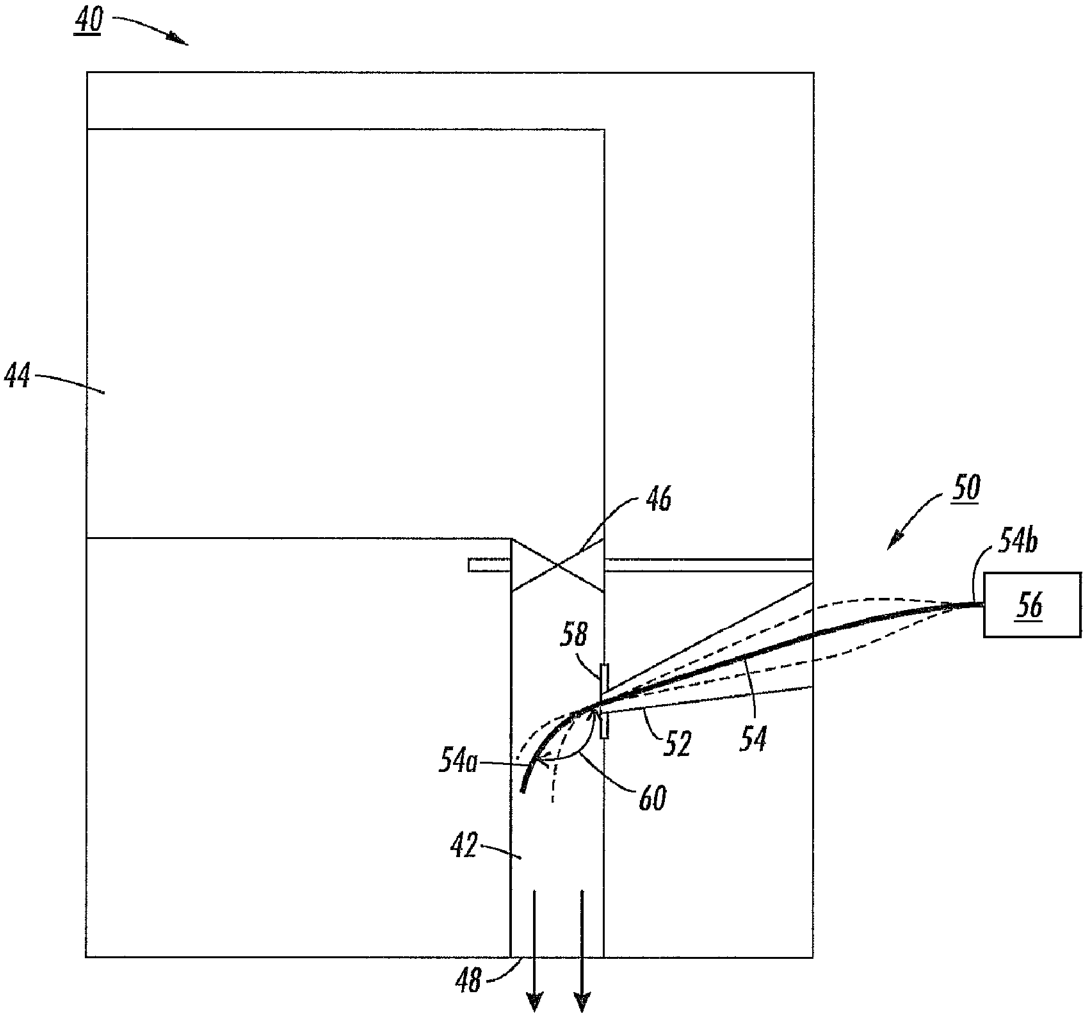
FIG. 5 is a top view illustration of a stirring/agitation mechanism employing a curved stirring element.

FIG. 5 depicts a fluidic system 40, where fluidic channel 42 is arranged to receive fluid from fluid reservoir 44. In this design, gate valve 46 is provided to selectively interrupt a communication path between fluidic channel 42 and fluid reservoir 44. Isolating fluidic channel 42 from fluid reservoir 44, prior to agitation prevents the dispersed fluid from flowing back into fluid reservoir 44. As in previous examples, an extraction aperture 48 is provided for removing fluid from fluidic channel 42. Also provided is an alternative integrated stirring/agitation mechanism 50. In this design, tube/ access channel 52 is positioned at an oblique angle to fluidic channel 42. Stirring mechanism 54, having a first stirring end 54*a* and a second stirring end 54*b*, is located at least partially within tube 52 and is motivated by external actuator 56. Seal 58 is provided at the interface between tube 52 and fluidic channel 42 to prevent leaking of the fluid. First stirring end 54*a* is located within the interior of fluidic channel 42, and second stirring end 54*b* is connected to actuator 56. As can be noticed, and different from FIGS. 1 and 2, first stirring end 54*a* is configured with an angle 60 between the end and the substantially straight section 54 of the fiber, which results in a longer portion of first stirring end 54*a* being within the fluidic channel as compared to first stirring end 22*a* of FIG. 1, permitting greater interaction with a larger volume of fluid. In one embodiment, the angle 60 of first stirring end 54*a* is in a range from 5° to 90°, and more preferably in the range of 20° to 60° from the remainder of the stirring element, wherein the stirring element is at rest.

It is of course to be appreciated that while FIG. 5 illustrates a fluidic system such as a particle concentrator, stirring/agitation mechanism 50 may be used in other fluidic systems, including but not limited to the fluid mixing system of FIG. 2.

Figure 6:
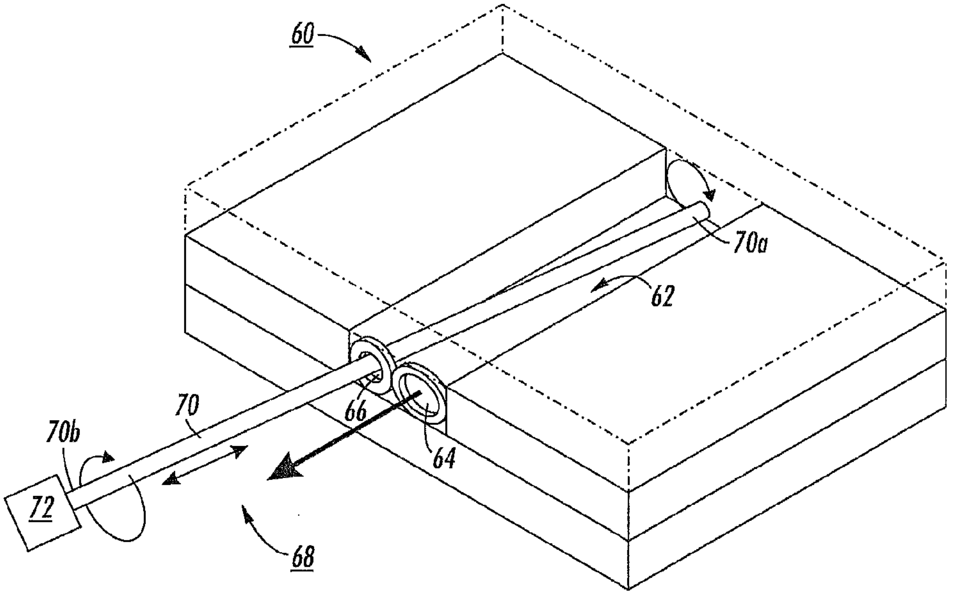
FIG. 6 depicts an alternative embodiment of another fluid stirring/agitation mechanism integrated within a fluid system.

Turning to FIG. 6, set forth is a further embodiment of a fluidic system 60 having a fluidic channel 62, an output port or aperture 64 and a stirring agitation mechanism port or aperture 66, for use with stirring/agitation mechanism 68. Stirring/agitation mechanism includes stirring/agitation element 70 having first stirring end 70*a*, and second stirring end 70*b*. The second stirring end 70*b* is connected to external actuator 72, and the first stirring end 70*a* is located within fluidic channel 62 through aperture 66. The aperture is closed off by a membrane 74 (e.g., a Gortex (™) membrane), frame 76 combination which (see FIG. 7) provides a pivot point (or fulcrum) for movement of the stirring/agitation element 70. The frame 76 is shown as a circular element, but it could also have a different geometry, such as square or rectangular or other appropriate geometric shape. The aperture 66 could also be sealed off by an elastomeric polymer such as a silicone gel, which would allow the stirring mechanism or stirring beam to move around the fulcrum, while blocking off the liquid from within the channel 62.

In this embodiment, actuation of stirring mechanism 70 is (in a circular) pattern, as opposed to the linear action in the previous examples. It is also noted that in the previous examples the actuation does not need to be linear. The vibration modes previously shown could also occur in two dimensions, similar to the string of a violin. Shown in FIG. 6 is a circular actuation of the stirring mechanism 70 which means the stirring rod moves on the surface of a cone with the tip of the cone positioned at the fulcrum. However, other actuation patterns may be used, such as linear (e.g., which may be useful if the channel is much wider than it is tall) or rectangular (e.g., if the main purpose is to wipe particles off the surface of the channel), or a combination of these actuation patterns.

The stirring mechanism is inserted substantially parallel to fluidic channel 62. Stirring element 70 may be a rigid fiber or rod. The present configuration permits stirring element 70 to have an extended portion of its length to interact with the fluid in fluidic channel 62, and provides a relatively simple, potentially inexpensive integration of the stirring element into the fluidic system. In one example, the stirring element may be inserted into the fluidic channel by puncturing a membrane, such as membrane 74 shown in FIG. 7 (e.g., a Goretex membrane) or by pushing the stirring element 70 through a wall made from an elastomeric material such as a silicone. It also is noted that the stirring element 70 may be moved in a direction parallel to the channel in order to stir various areas of the channel more efficiently. Stirring end 70*a* will exhibit the greatest deflection and therefore the agitation of the fluid is strongest near this end. The stirring mechanism may be moved during the stirring actuation. In order to enable movement of the stirring mechanism, the aperture 66 consists of a seal that allows sliding of the stirring element (e.g., a punctured Goretex membrane or a punctured silicone wall would allow this movement).

It is to be appreciated while the design provided here shows the stirring mechanism 68 placed in parallel to the fluidic channel 62, it can be arranged to enter the fluidic channel from the side where the stirring mechanism is perpendicular to the fluidic channel, or it may enter a fluid reservoir which does not have an orientation. Although stirring mechanism 68 is depicted as a straight piece of material, various designs can be implemented, such as an S-shape, multiple ends, curved, etc. Additionally, this design may be used both for situations where the intent is to break the adhesion of particles from the walls and sidewalls of the fluidic channel, as well as to mix fluids which have been merged into a merged fluidic channel.

Figure 7A:
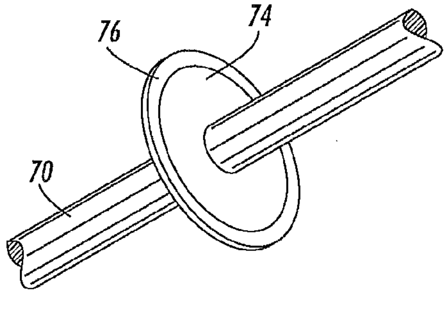
FIGS. 7A-7B depict stirring elements in connection with a sealing member which acts as a fulcrum. These can be incorporated within stirring/agitation mechanisms of the present application.
Figure 7B:
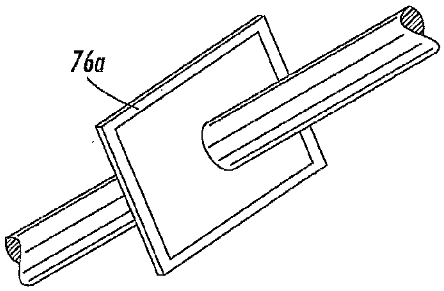

Turning to FIG. 7A, depicted in more detail is the membrane 74, frame 76 combination. It is to be understood membrane 74 needs to be sufficiently flexible or thin to permit motion of stirring element 68 around the pivot point (or fulcrum). However, it is also necessary that it be sufficiently rigid at the appropriate locations to ensure a tight fit or seal with aperture 66. Therefore frame 76 is used to provide a substantially rigid feature to membrane 74. In some instances, stirring element 70, membrane 74 and frame 76 may be molded as one part, e.g., from a material such as polycarbonate, polypropylene or other suitable molding materials. The frame 76 may also assist in the assembly of the stirring tube and the fluidic system. For example, the frame 76 may fit into a slot or cut-out in the fluidic system to accurately position the stirring tube. Further, although membrane 74 and frame 76 are drawn as circular, this arrangement can have other geometric shapes, such as the four-sided (e.g., square or rectangle) membrane 74*a*, frame 76*a* arrangement of FIG. 7B.

As in all the embodiments, it is understood this design of stirring/agitation mechanisms is actuated external to the fluidic system. In some embodiments, the fluidic system may be designed as a fluidic chip. By having the actuation mechanism external, and the remaining portions of the stirring/agitation mechanisms integrated, if the fluidic chip is inexpensive and disposable, then the actuation system may be made to be detachable (e.g., by a clip mechanism) from the remaining portion of the mechanism to save the cost of destroying the actuation mechanism when the chip is disposed.

The vibrating stirring element may cause tribocharging which may cause problems for the extraction. In order to avoid or reduce this effect, the stirring element may consist of a material which is electrically conductive such as metal or a metal coated material. It also may consist of a polymer that has some conductivity (such as a polymer filled with carbon nanotubes or other conductive particles)

Figure 8:
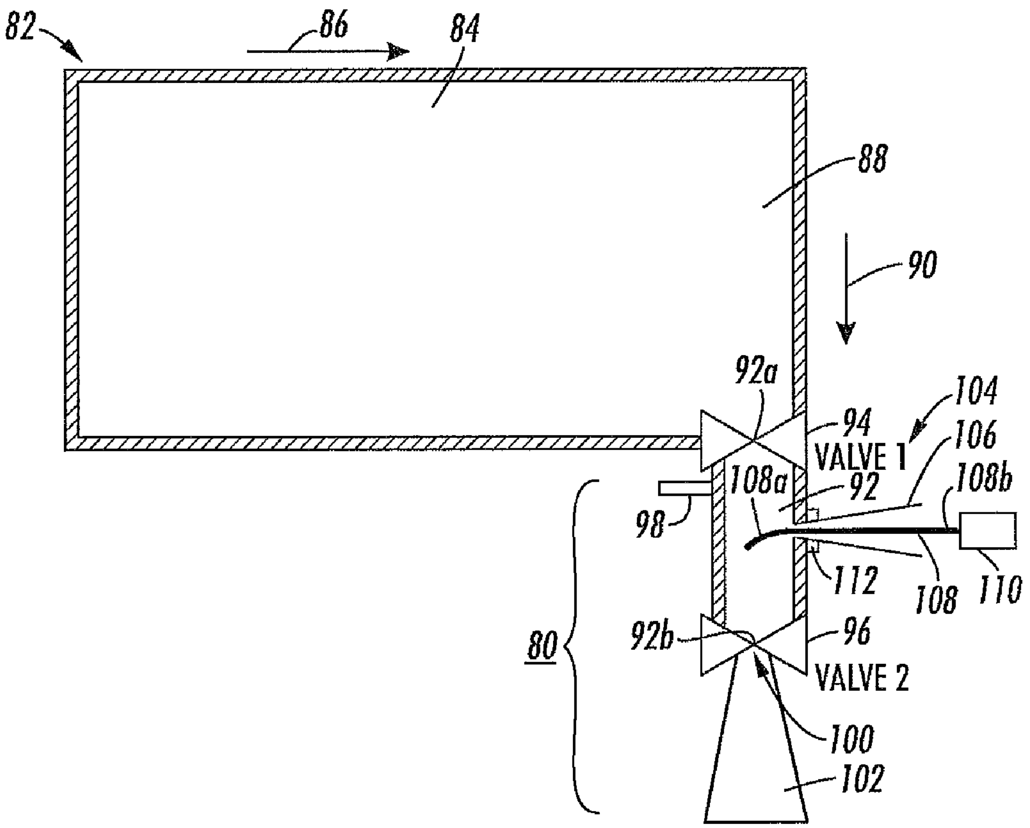
FIG. 8 illustrates a block structure for extracting a concentrated sample in accordance with the concepts of the present application.

Turning to FIG. 8, illustrated is an embodiment of an arrangement by which improved extraction and transfer of particles of a concentrated sample in a particle concentrator may be achieved, which incorporates the above-described stirring/agitation concepts. More particularly, in the top view of FIG. 8, illustrated is a block representation of an extraction mechanism 80 used in cooperation With a particle concentrator 82. Particles are motivated in a first direction 86 in order to move the particles from a low concentration to a high local concentration, such as in area 88. Thereafter, through the use of additionally provided, transversely operational traveling wave grid mechanisms, the particles are moved in a second direction 90 into concentrate reservoir (e.g., a fluidic chamber) 92 having first end 92*a* with an opening, and second end 92*b*, with an opening. Extraction mechanism 80 includes a first valve (valve1) 94, a second valve (valve2) 96, venting mechanism 98, extraction port 100, sample capture reservoir 102 and stirring/agitation mechanism 104.

Valve1 is located at the entrance or first end of concentrate reservoir 92, and valve2 is located near its exit or second end. Valve1 94 may be a mechanical valve such as a shutter, or it may be an impedance valve based on different fluidic impedances existing due to fluid entering and exiting concentrate reservoir 92. In addition to these valves, any other type of valve used in fluidic or micro-fluidic applications, such as a valve based on air pressure, phase change material or other designs, may also be used.

Valve2 96, located at the exit of concentrate reservoir 92, may be configured of valve types similar to those of valve1. However, valve2 may also be integrated or connected to the sample capture reservoir 102 in situations where sample capture reservoir 102 is directly connected to concentrate reservoir 92.

With more specific attention to the concepts of the present application, stirring/agitation mechanism 104 is incorporated into extraction mechanism 80 by use of tube or an access channel106 which enters substantially perpendicular (e.g., this is shown in FIG. 8, but it could be entering at an angle 28, as indicated in FIG.1) to concentrate reservoir 92. A stirring element 108 is partially located within tube 106, with a first stirring end 108*a* located within concentrate reservoir 92, and second stirring end 108*b* in operative detachable connection with external actuator 110. A seal 112 is located at the interconnection between concentrate reservoir 92 and tube 104. Tube (or access channel) 106 enters concentrate reservoir 92 through an opening in a sidewall of the concentrate reservoir. As previously described, actuator 110 is operated to motivate stirring element 108 to disturb or agitate fluid within concentrate reservoir 92. Once the stirring/agitation process is complete, fluid is moved from concentrate reservoir 92 to sample capture reservoir 102 by a variety of mechanisms, including aspirating the fluid, or pushing the fluid out of the concentrate reservoir into the sample capture reservoir.

Venting mechanism 98 is connected in operative association with the concentrate reservoir at a location near valve1 94 to allow for maximum displacement of the concentrate due to conservation of volume during the extraction process. Venting mechanism 98 may also be used to backfill concentrate reservoir 92 either with air or a liquid as the particles in the concentrated sample are extracted to the sample capture reservoir.

Figure 9:
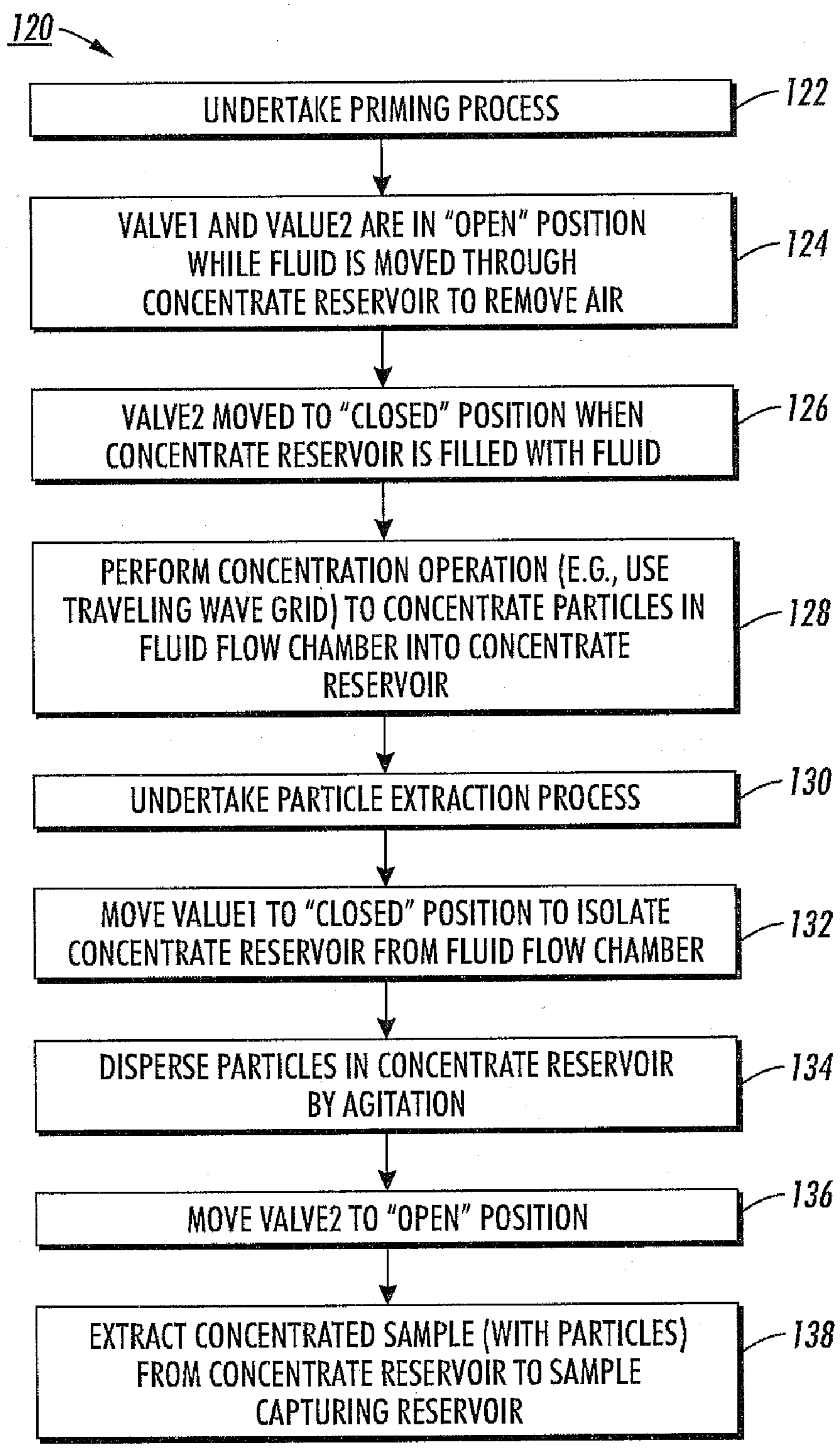
FIG. 9 provides a process sequence for the extraction process.

With attention to FIG. 9, set forth is a process flow 120 for extracting the concentrated sample from the concentrate reservoir shown in FIG. 8. Initially, a priming of the extraction mechanism, including the concentrate reservoir, is undertaken (step 122). Priming is valuable to flush out any undesirable contaminates and to remove air from the concentrate reservoir. Initially, valve1 and valve2 are positioned in an open state (step 124) to permit fluid to fill the concentrate reservoir, removing any trapped air. Next, once the concentrate reservoir has been filled with liquid, valve2 is positioned to a closed state (step 126). Following the closing of valve2, operation of the particle concentrator is undertaken (step 128), such as by operation of a traveling wave grid. This operation acts to concentrate the particles into the concentrate reservoir. Thereafter, a sample extraction process is begun (step 130). This process includes closing valve1 to isolate the concentrate reservoir from the fluid flow chamber (step 132). Next, the fluid within the concentrate reservoir is stirred/agitated to disperse particles that have adhered to a surface or bottom of the concentrate reservoir (step 134). Stiffing/agitation is intended to increase the amount of particles in the concentrate sample which will be extracted. Thereafter, valve2 is moved to an open position (step 136), and the concentrate sample (fluid within the concentrate reservoir) is extracted to a sample capture reservoir (step 138).

Figure 10:
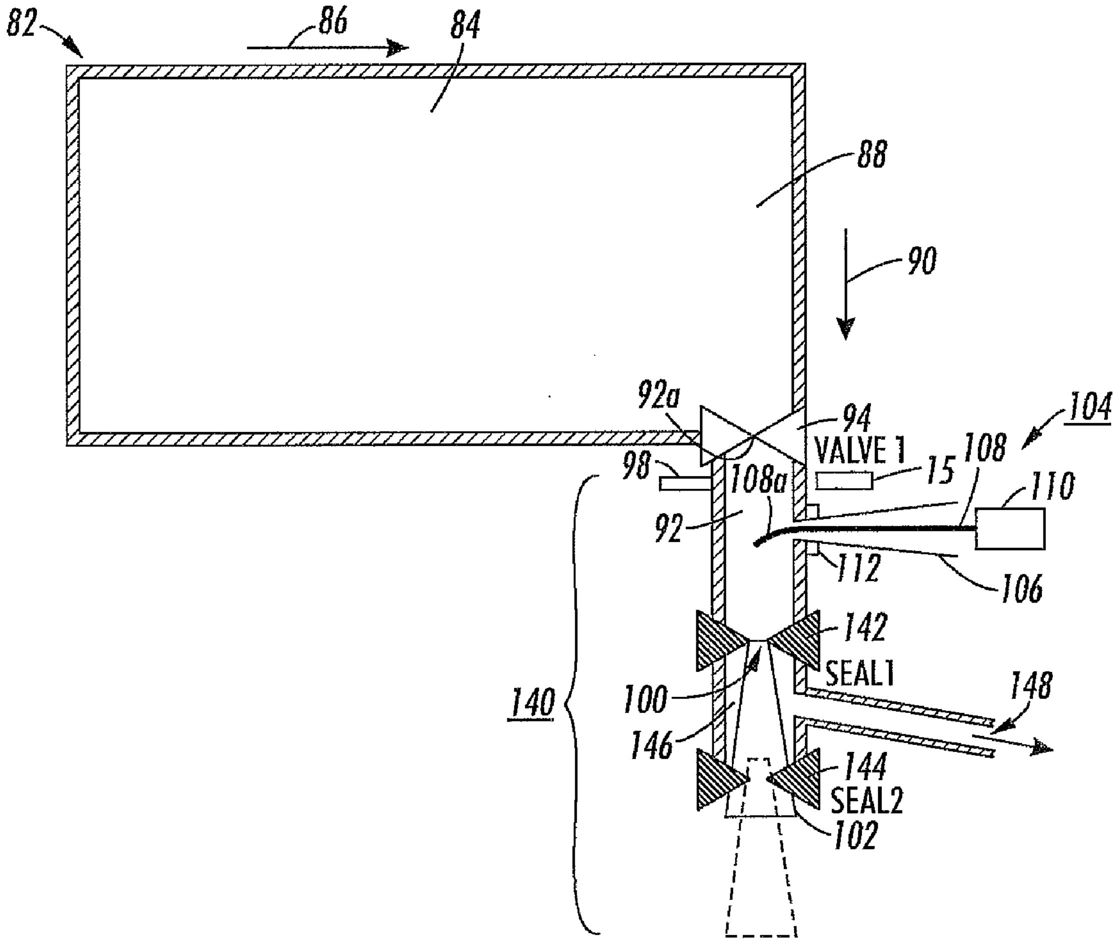
FIG. 10 sets forth another embodiment for an extraction mechanism in accordance with the concepts of the present application.

Turning attention to FIG. 10, illustrated is a fluid system employing a different extraction mechanism 140 from the extraction mechanism of FIG. 8, which incorporates the stirring/agitation concepts discussed above. Like numbered elements of FIG. 8 are similarly numbered here. Extraction mechanism 140 replaces valve2 with a multi-positional sample capture reservoir 92 between a seal1 142 and seal2 144. The area between seal1 142 and seal2 144 defines flushing chamber 146 having output flushing port 148. Optionally provided is concentration detector 150, which may also be used in the previous embodiments, configured by use of known detectors to determine an amount of particle concentration found within concentration reservoir 92. The detector may be an optical detector, such as a photo-diode that measures light absorption or fluorescence of the collected particles. Other detectors may be used which employ alternative detection schemes.

Stirring/agitation mechanism 104 of FIG. 10 is incorporated in this embodiment and will operate in a similar manner as previously described.

Figure 11A:
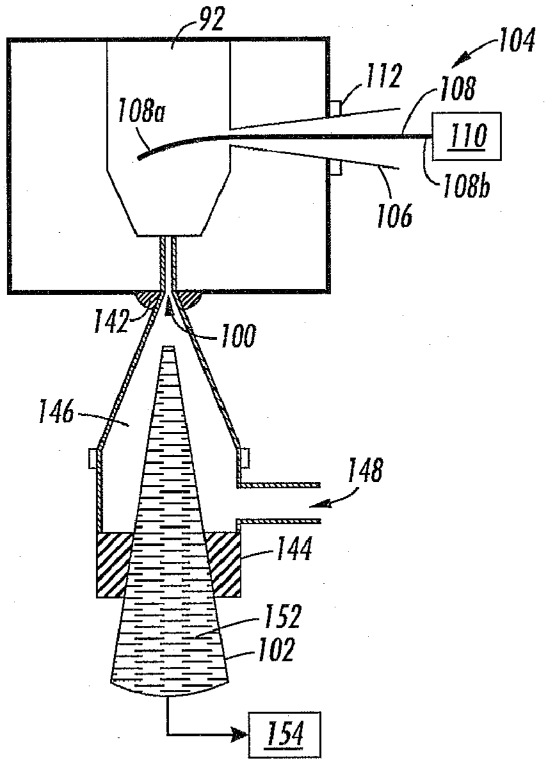
FIGS. 11A and 11B illustrate two modes of operation for the sample capture reservoir of FIG. 10.
Figure 11B:
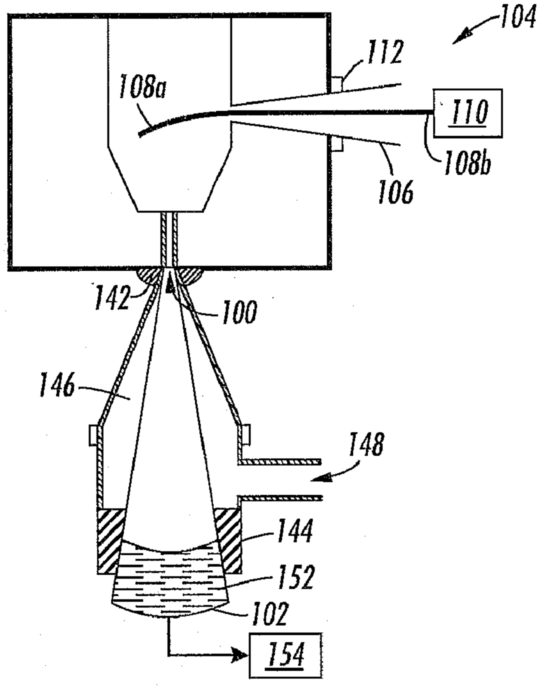

Turning to FIGS. 11A and 11B, set out is a more detailed view of a multi-positional configuration for sample capture reservoir 102. In the arrangement, concentrate reservoir 92 is shown with angled walls near its lower end port. These angled walls are provided to minimize the particle adhesion. Similar angled walls may be used in any of the fluidic systems previously discussed. FIG. 11A depicts an arrangement when extraction mechanism 140 is in a flushing mode (e.g., priming mode), and FIG. 11B illustrates extraction mechanism 140 in an extraction mode. As shown here, seal1 142 provides a leak proof contact between the upper end of the flushing chamber 146 and extraction port 100. Seal 144 (seal2) is a self-sealing member whereby when sample capture reservoir 102 is removed, seal 144 provides a fluid-tight seal.

In the flushing mode of FIG. 11A, sample capture reservoir 102 is filled with a filling substance 152, and is therefore in a non-fluid accepting arrangement. As will be discussed more fully below, during the priming operation fluid from the concentrate reservoir is stopped from entering the interior of the sample capture reservoir by use of the filling substance. In this embodiment the filling substance is an oil, such as mineral oil. However, it is to be understood filling substance 152 may be any incompressible and immiscible liquid or other material known not to dilute or otherwise mix or allow dilution of the sample fluid within concentrate reservoir 92. Mineral oil has both properties which are important during the aspiration step to extract the concentrate.

A portion of sample capture reservoir (e.g., pipette tip, tube, etc.) 102 is shown connected to a device which is capable of extracting filling substance 152 at an appropriate time. In one embodiment, extracting device 154 may be a syringe or any other component which is capable of drawing the filling substance out of the sample capture reservoir.

Figure 12:
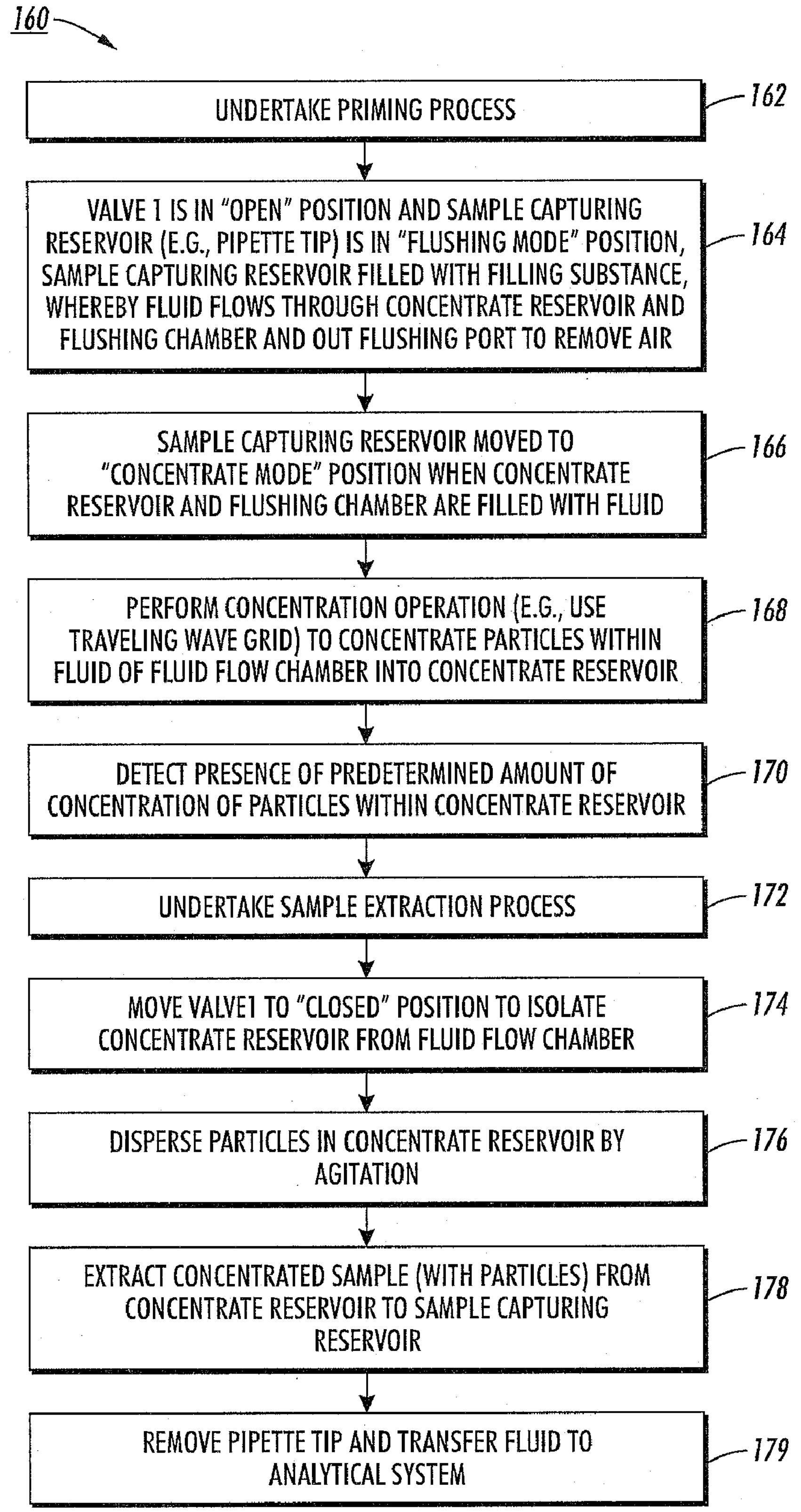
FIG. 12 is a process flow for operation of the extraction mechanism of FIG. 10.

Turning now to process flow 160 of FIG. 12, and with continuing attention to FIGS. 10, 11A and 11B, operation of the system will be discussed.

The process is initiated with a priming operation (step 162). To perform the priming operation, valve1 is opened and the sample capture reservoir (e.g., pipette tip) is in the flushing mode position shown in FIG. 11A. At this time, the sample capture reservoir is filled with the filling substance such that fluid from the concentrate reservoir cannot enter the sample capture reservoir. With valve1 open, fluid flushes through the flushing chamber and out the flushing port. This priming operation continues until all air is removed from the concentrate reservoir as well as from the flushing chamber (step 164).

It is also noted that during the flushing mode, the stirring mechanism 108 may or may not be positioned within tube 106 such that first stirring end 108*a* is within concentrate reservoir 92. Particularly, the stirring mechanism may not yet be located within the interior of concentrate reservoir 92, and in this instance, self-sealing seal 112 maintains the integrity of the concentrate reservoir such that fluid does not leak out.

Alternatively, first stirring end 108*a* may be within the chamber during the flushing mode, and the seal 112 nevertheless maintains the integrity of the fluid within the concentrate reservoir 92.

Next, sample capture reservoir is moved into the extraction mode position of FIG. 11B, bringing the sample capture reservoir into operational contact with seal1. At this point, the interior of the sample capture reservoir is filled with the filling substance, whereby no fluid within the concentrate reservoir moves into the sample capture reservoir or the flushing chamber. More particularly, movement of the sample capture reservoir causes the sample capture reservoir to act as a stop valve to the outflow of fluid from the concentrate reservoir (step 166).

At this point, particle concentration operations are undertaken (step 168), whereby particles in the fluid flow chamber are moved into the concentrate reservoir.

In an optional embodiment, step 170 permits operation of the particle concentration operations to continue until the presence of a certain preset amount of concentration of the particles is detected by the concentration detector. Once detection has occurred (or if the detector is not included in the process, after a desired time) the process moves to a sample extraction mode (step 172). In this portion of the process, valve1 is closed (step 174), to isolate the concentrate reservoir from the fluid flow chamber. Next, the particles in the concentrate reservoir are stirred/agitated by the stirring/agitation mechanism (step 176). Following the stirring/agitation step, the fluid sample from the concentrate reservoir is extracted to the sample capture reservoir by aspiration. More particularly, in this embodiment, and as depicted in FIG. 11B, an extracting mechanism is used to withdraw the filling substance from the interior of the sample capture reservoir, thereby drawing in the concentrate sample from the concentrate reservoir (step 178). The aspiration continues until all or some other desired amount of the filling substance is removed from the sample capture reservoir and is replaced by the concentrate sample. Next, the sample capture reservoir is removed from the flushing chamber by moving it past seal2 (step 179). Seal2 is self-sealing, thereby holding any fluid within the flushing chamber once the sample capture reservoir is removed. The extracted sample capture reservoir is then provided to analytical devices/systems for further testing and experimentation.

Figure 13:
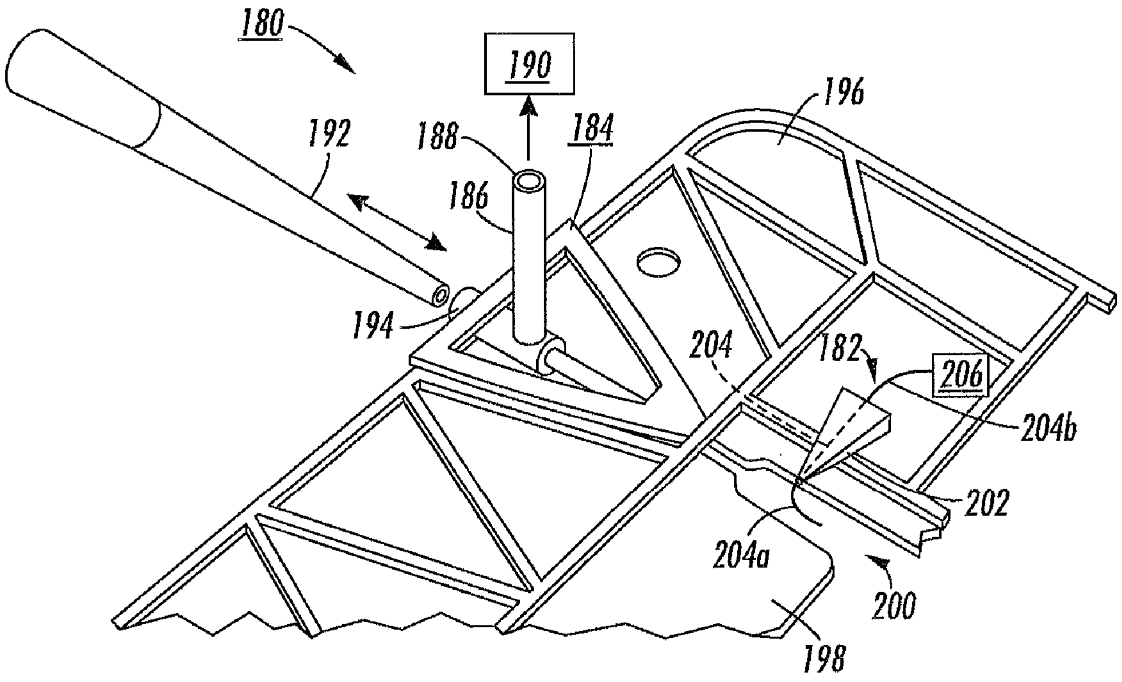
FIG. 13 shows an embodiment of components for the extraction mechanism of FIG. 10.
Figure 14A:
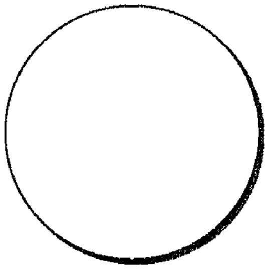
FIGS. 14A-14F illustrate potential cross sections for the fiber or rod used in the agitation mechanism of the present application.
Figure 14B:
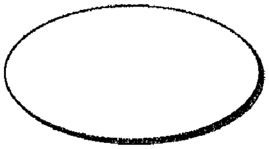
Figure 14C:
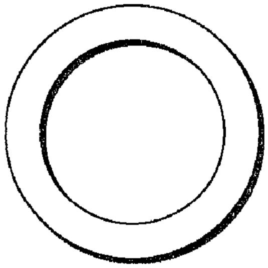
Figure 14D:
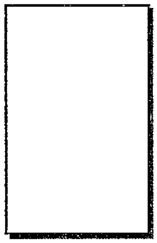
Figure 14E:
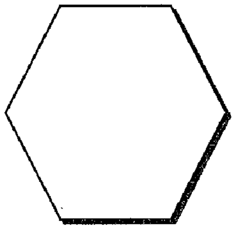
Figure 14F:
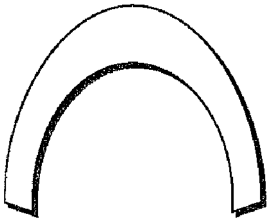
Figure 15A:
FIGS. 15A-15F illustrate side views of the fiber or rod used in the agitation mechanism of the present application.
Figure 15B:
Figure 15C:
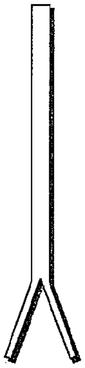
Figure 15D:
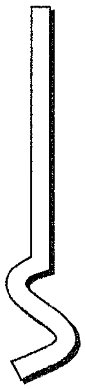
Figure 15E:
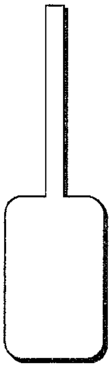
Figure 15F:
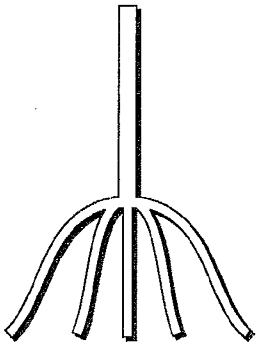

FIG. 13 illustrates a particular embodiment showing a partial view of a fluidic system with an extraction mechanism 180, and stirring/agitation mechanism 182. Extraction mechanism 180 includes a manifold (e.g., made of silicone or other appropriate material) 184. The manifold 184 may be molded or formed by other appropriate processes and is designed to include a flushing chamber 1 86 and flushing port 188 leading to a waste reservoir 190. Also included is a connection for a sample capture reservoir 192, which in this embodiment is shown as a pipette tip. An extraction mechanism 180 is designed to provide the sample capture reservoir 192 as a multi-positional arrangement, such as discussed in connection with FIG. 10. Therefore, the manifold also includes the previously described valve1, along with seal1 and seal2, where seal2 is self-sealing when the pipette tip is removed. The triangular manifold 184 fits into a molded frame (e.g., made of polycarbonate or other appropriate material) 196 configured with particle concentrator area 198 including concentrate reservoir area 200 in which concentrated sample with particles is held.

The stirring/agitation mechanism 182 is depicted as being in operable connection with concentrate reservoir 200. More specifically, tube 202 is embedded into frame 196, either permanently or in a snappable insert arrangement such as manifold 184, whereby an opening is provided to concentrate reservoir 200. A stirring mechanism 204, similar to previous stirring mechanisms, has a first stirring end 204*a* located within concentrate reservoir 200, and a second stirring end 204*b* connected to external actuator 206. As in previous designs, the connection of the second stirring end 204*b* and external actuator 206 is detachable. By this configuration, when frame 196 is disposable, stirring mechanism 204 is detached from external actuator 206, and the actuator is reused.

The fibers and/or rods described in the foregoing embodiments have generally been represented as substantially uniform, circular fibers or rods, however, and as discussed above, they may be provided in a variety of designs. For example, as illustrated in FIGS. 14A-14F, the fibers may be configured in multiple cross sections, and as shown in FIGS. 15A-15D, the fibers do not need to be simply a straight, but may have tapered, branched or partially curved portions. It is to be understood, the embodiments shown in FIGS. 14A-14F and 15A-15F are simply representative, and further fiber configurations may be used within the concepts of the present application.

The fibers/rods may be made from a material such as a metal, a polymer, glass, ceramic and other materials. A stirring rod may also consist of two (or multiple) sections made of different materials, for example to achieve different levels of stiffness. In one example, the stirring rod may consist on one end of a rather rigid metal (e.g., steel) tube/rod which connects to the actuation mechanism and at the other end of a rather flexible polymer (e.g., nylon) fiber. The fibers, particularly in the case of polymer fibers/rods, may be fabricated by known methods such as extrusion, molding, laser-cutting, laser-welding, embossing, stamping, etc.

Attachment of the fibers/rods to the actuation mechanism can occur by a clamping or interlocking mechanism, by magnetic coupling, adhesive force, etc. The fibers/rods may be of different sizes, depending on the implementation. However, in particular embodiments where the fluidic systems are micro-/miniature fluidic systems, fibers/rods in the range of approximately 25-1000 microns in diameter, and in some other embodiments a diameter in the range of approximately 50-500 microns are particularly useful. It is to be understood the diameters discussed here is to a body of the fiber or rod, and that bristles, arms, etc. extending from the body may extend outside this diameter.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A micro-fluidic system comprising:

a micro-fluidic merge channel or reservoir for holding fluid, the fluid being an inhomogeneous gas or liquid originating from at least two sources; and a micro-fluidic stirring/agitation mechanism partially integrated with the merge channel or reservoir and having, i) a fiber or rod at least partially situated inside of the merge channel or reservoir, ii) a tube or access channel which is in operative connection with the merge channel or reservoir, wherein a passageway is provided between the merge channel or reservoir and the tube or access channel, the fiber or rod further including a first end and a second end, the first end is passed through the interior of the tube and extends into the merge channel or reservoir, and iii) a stirring actuator, external to the tube, in operative connection with the second end of the fiber or rod, wherein operation of the stirring actuator causes movement of the first end of the fiber or rod in the merge channel or reservoir wherein the at least two sources include at least a first channel or reservoir containing inhomogeneous gas or liquid from the first source and a second channel or reservoir containing inhomogeneous gas or liquid from the second source, each of the first channel or reservoir and the second channel or reservoir in operative connection with the merge channel, and the gas or liquid in the first channel or reservoir and the gas or liquid in the second channel or reservoir are merged together in the merge channel or reservoir.

2. The system according to claim 1, wherein the stirring actuator is configured to generate variable actuation excitation frequencies, which permit periodic scanning of the actuation frequencies.

3. The system according to claim 1, wherein the fiber or rod enters the channel or reservoir at an angle between 0° to 90° to flow direction of the fluid.

4. The system according to claim 1, wherein an end of the fiber or rod within the channel or reservoir is bent at an angle with respect to the remainder of the fiber or rod when the fiber or rod is in a rest position.

5. The system according to claim 1, wherein at least one of (i) the passageway is made to coincide with a fulcrum or (ii) the passageway is made to coincide with a vibration node of fiber or rod movement.

6. A micro-fluidic system comprising:

a channel or reservoir for holding fluid; and a stirring/agitation mechanism partially integrated with the channel or reservoir, the stirring/agitation mechanism including a fiber or rod at least partially situated inside of the channel or reservoir, the fiber or rod having a body diameter in the range of 25 to 1000 microns.

7. The system according to claim 6, wherein the stirring/agitation mechanism includes:

a tube or access channel which connects to the channel or reservoir, wherein a passageway is provided between the channel or reservoir and the tube or access channel;

a stirring element having a first end and a second end, the first end passed through the interior of the tube and extending into the channel or reservoir; and a stirring actuator external to the tube in operative connection with the second end of the stirring element, wherein operation of the stirring actuator causes movement of the first end of the stirring element in the channel or reservoir.

8. The system according to claim 6, further including an extraction arrangement including, a fluid path which extends between the channel or reservoir and a flushing port, and a sample capture reservoir positioned at least partially within the fluid path.

9. The system according to claim 8, wherein the sample capture reservoir is filled with a filling substance which does not dilute or allow dilution of the concentrated sample.

10. The system according to claim 8, wherein the sample capture reservoir is multi-positional.

11. The system according to claim 10, wherein the multi-positions of the sample capture reservoir include a position during a particle concentration mode and a different position during a particle extraction mode.

12. The system according to claim 6, further including a particle concentrator having a traveling wave grid.

13. The system according to claim 6, wherein the stirring actuator is configured to generate a number of different frequencies, permitting the stirring actuator to scan the different frequencies to excite a resonance mode in the stirring element.

14. The system according to claim 6, further including a heater associated with the channel or reservoir to heat fluid within the channel or reservoir, resulting in the fluid being inhomogeneous, and wherein the stirring/agitation mechanism is configured to produce an increased thermal equilibrium within the channel or reservoir.

* * * * *

UNITED STATES PATENT AND TRADEMARK OFFICE

CERTIFICATE OF CORRECTION

PATENT NO. : 8,354,076 B2
APPLICATION NO. : 11/537679
DATED : January 15, 2013
INVENTOR(S) : Jurgen H. Daniel, Meng H. Lean and Armin R. Volkel It is certified that error appears in the above-identified patent and that said Letters Patent is hereby corrected as shown below:

In the Specification

Replace the paragraph at Col. 1, lines 6-10, with the following paragraph:

This invention was made with Government Support under Contract No. W911NF-05-C-0075 awarded by the U.S. Army. The Government has certain rights in this invention.

Signed and Sealed this
Sixth Day of August, 2013

Teresa Stanek Rea
*Acting Director of the United States Patent and Trademark Office*